United States Patent [19]
Schmidt et al.

[11] Patent Number: 5,307,211
[45] Date of Patent: * Apr. 26, 1994

[54] TRUNCATED CONVEX VEHICULAR MIRROR SURFACE

[76] Inventors: William P. Schmidt, 21000 Woodruff, Rockwood, Mich. 48173; Frank D. Hutchinson, 28000 Beel Rd., New Boston, Mich. 48164

[*] Notice: The portion of the term of this patent subsequent to Jul. 3, 2007 has been disclaimed.

[21] Appl. No.: 706,264

[22] Filed: May 28, 1991

Related U.S. Application Data

[63] Continuation-in-part of Ser. No. 361,334, Jun. 5, 1989, Pat. No. 5,005,963, which is a continuation-in-part of Ser. No. 254,027, Oct. 6, 1988, Pat. No. 4,938,578.

[51] Int. Cl.$^5$ .......................... G02B 5/10; G02B 7/182
[52] U.S. Cl. ...................... 359/868; 359/871; 359/872
[58] Field of Search ................. 359/868, 871, 872

[56] References Cited

U.S. PATENT DOCUMENTS

| | | | |
|---|---|---|---|
| 4,436,372 | 3/1984 | Schmidt et al. | 359/868 |
| 4,512,634 | 4/1985 | Stout | 359/872 |
| 4,938,578 | 7/1990 | Schmidt et al. | 359/868 |
| 4,991,814 | 2/1991 | Schmidt et al. | 359/872 |
| 5,005,963 | 4/1991 | Schmidt et al. | 359/868 |

*Primary Examiner*—Bruce Y. Arnold
*Assistant Examiner*—John Juba, Jr.
*Attorney, Agent, or Firm*—Weintraub, DuRoss & Brady

[57] ABSTRACT

A mirror surface for mounting onto an exterior front fender of a vehicle. The mirror surface is a portion of a convex surface ellipsoid with a plurality of radii of curvature. The mirror provides the driver of the vehicle with a field-of-view that is greater than the reflection angle about the vertical axis. The reflective surface has a generally convex shape throughout. The reflective surface a viewing center point that is in general alignment to the geometric center of the reflective surface. The reflective surface is generally symmetrical about a vertical plane passing through the viewing center point and about a horizontal plane passing through the viewing center point.

8 Claims, 3 Drawing Sheets

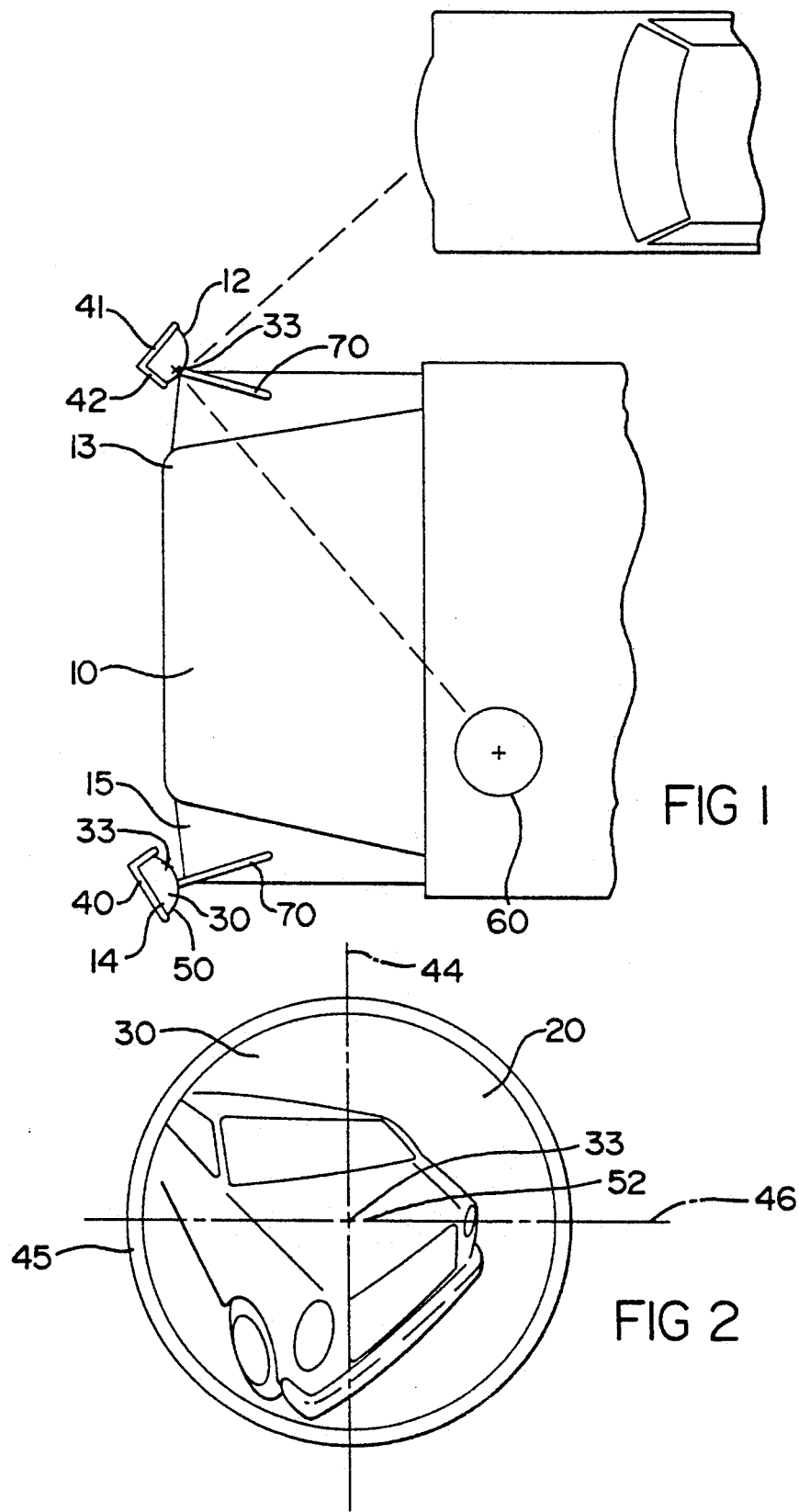

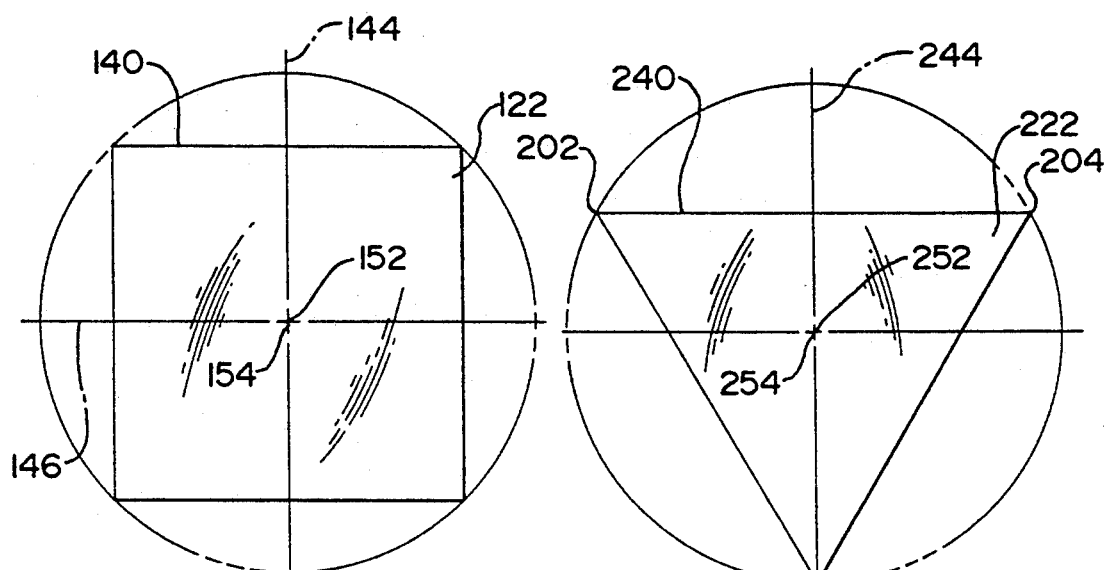
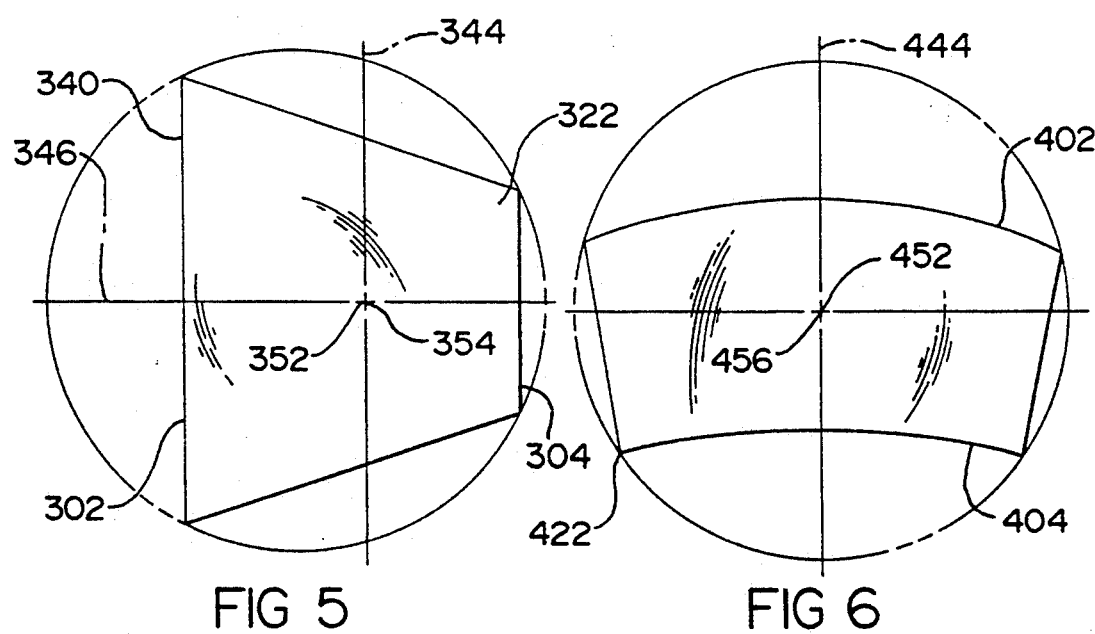

TRUNCATED CONVEX VEHICULAR MIRROR SURFACE

CROSS-REFERENCE TO RELATED APPLICATIONS

This is a continuation-in-part of patent application Ser. No. 07/361,334, entitled "Vehicular Mirror", filed on Jun. 5, 1989, now U.S. Pat. No. 5,005,963, and which in turn is a continuation-in-part of U.S. patent application Ser. No. 07/254,027, entitled "Truncated Mirror Surface", filed on Oct. 6, 1988 and is now U.S. Pat. No. 4,938,578 now U.S. Pat. No. 4,938,578, the disclosure of both references being hereby incorporated by reference.

FIELD OF THE INVENTION

The present invention relates to a mirror surface for use with vehicles. More particularly, the present invention concerns convex mirrors. Even more particular, the present invention relates to guadric convex mirror surfaces and mirrors.

PRIOR ART

Large vehicles generally log massive amounts of mileage, and it is necessary that their drivers have clear vision of all objects about the vehicles. Although current laws make rear-view mirrors mandatory, the size and shape of such mirrors vary considerably.

Vehicular mirrors surfaces were initially flat to minimize distortion. Traditionally, one mirror was mounted on each front fender of the vehicle to enable the driver to view objects positioned along both sides of the vehicle and to view objects disposed behind the opposite mirror. However, the art has come to recognize that "flat" mirror surfaces do not provide the requisite "field-of-view". For example, U.S. Pat. No. 4,013,914 teaches a hybrid-variation mirror surface, wherein the mirror surface is arcuate with a, generally, convex surface. The mirror has semi-circulate end portions. The central portion is curved with a constant longitudinal radius of predetermined value, and a constant transverse radius of a predetermined value which exceeds the longitudinal radius.

In U.S. Pat. No. 4,436,372 there is disclosed a mirror surface which reduces the problems of blindspots and distortion. The mirror or mirror surface thereof expands the field-of-view of the driver by providing a surface having an ellipsoidal shape similar to the shape of the human cornea. This patent, also, discloses a mirror surface using less than one-half of an ellipsoid reflective surface being, generally, truncated to less than 50%. Such a reflective surface enables a driver to view objects around and even behind the reflective surface. Furthermore, when these mirrors are mounted at the extreme forward position on the front fenders of a larger vehicle, there is considerable overlap in the field-of-view of each mirror.

Likewise, U.S. Pat. No. 4,938,578 teaches the effectiveness of ellipsoidal-shaped convex surface mirrors by their ability to expand the field-of-view while being truncated to reduce the blind area behind the mirror.

There still exists a need in the prior art for a rear view mirror which is mountable outside a large vehicle that provides the driver with an enlarged field-of-view and provides minimal distortion. The mirror's size, shape, and configuration relative to the vehicle should effectively reduce the size of the blindspot disposed behind the mirror. The primary advantage of the mirror surface of the present invention as detailed hereinbelow addresses this critical need, by providing a greater field-of-view over mirrors which are currently available, and being no longer than is necessary to minimize the size of the blind spot behind the mirror

SUMMARY OF THE INVENTION

In accordance with the present invention, there is provided a mirror having a reflective surface of a substantially convex-quadric shape throughout. The quadric surface is in the shape of an ellipsoid or a portion thereof, although a quadric surface may be a sphere, a hyperboloid, a paraboloid, a cylinder, or a cone, or the like. Preferably the shape of the reflective surface is an ellipsoid with a first radius of curvature and a second radius of curvature, the first radius being different from the second radius.

The quadric surface has a geometric center and the reflective surface has a viewing center. To take advantage of the unique geometry, the mirror is mounted onto a vehicle so that the geometric center is in substantial alignment with the viewing center.

While keeping the center of the reflective surface in tact, the size and shape of the reflective surface can be tailored for specific applications by truncating portions of the surface.

For a more complete understanding of the mirror surface of the present invention, reference is made to the following detailed description and accompanying drawings in which the presently preferred embodiments of the invention are illustrated. Throughout the following description and drawings, identical reference numbers refer to the same component throughout the several views.

BRIEF DESCRIPTION OF THE DRAWINGS

FIG. 1 depicts a plan view including two mirror assemblies of the present invention each positioned on the front of a large vehicle;

FIG. 2 depicts an enlarged plan view of the first embodiment of the mirror surface of the present invention, showing a view that a driver of the vehicle might see therein;

FIG. 3 is a plan view of a second embodiment of the mirror surface of the present invention;

FIG. 4 is a plan view of a third embodiment of the mirror surface of the present invention;

FIG. 5 is a plan view of a fourth embodiment of the mirror surface of the present invention;

FIG. 6 is a plan view of a fifth embodiment of the mirror surface of the present invention.

DETAILED DESCRIPTION OF THE INVENTION

Figure 7:
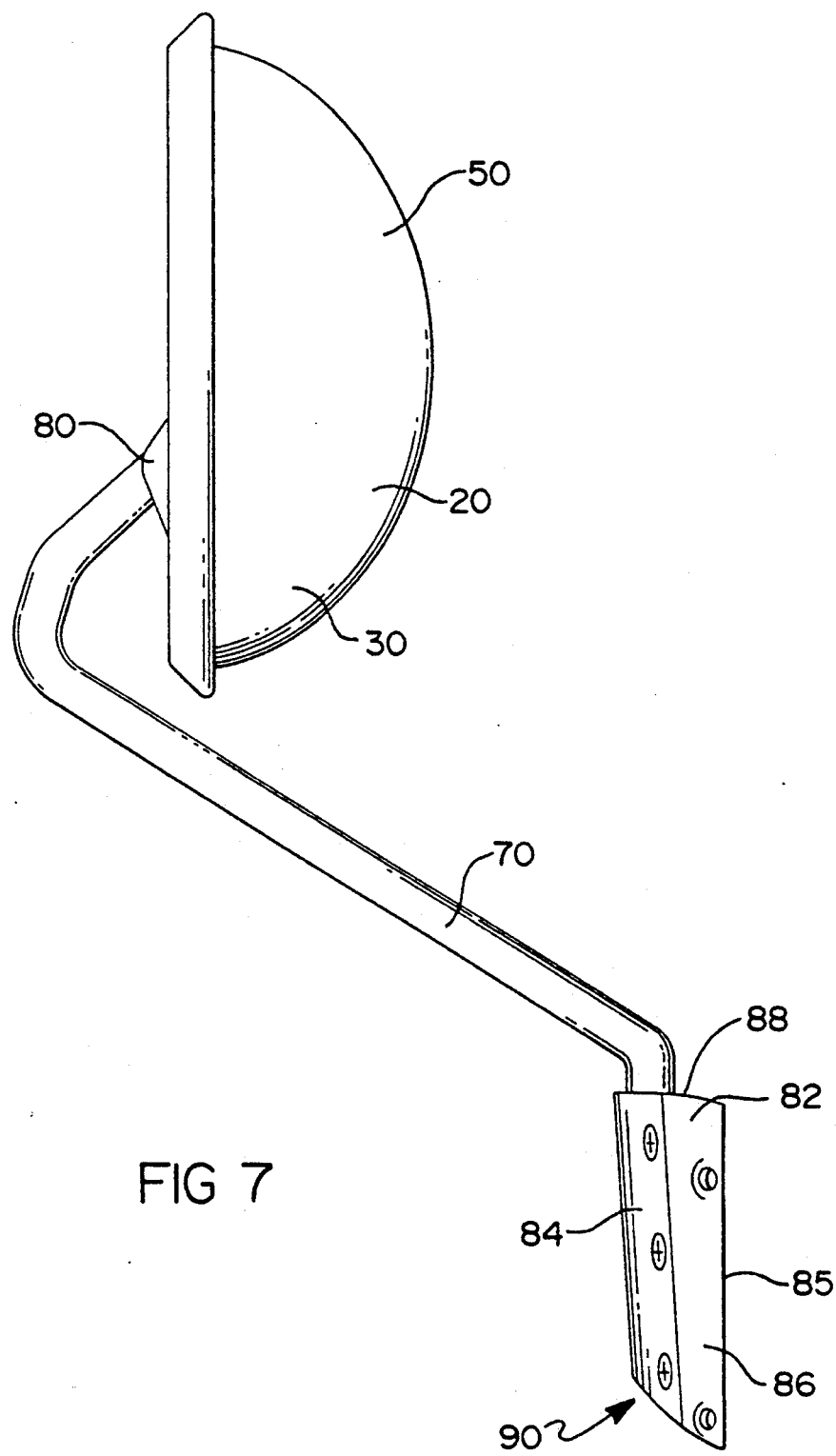
FIG. 7 is a plan view of a mirror assembly for mounting the mirror surface of the present invention to a vehicle.

Initially, it is to be noted (as used herein and in the appended claims) that various geometric configurations which are defined hereby are those generally perceived upon viewing a projection onto a planar surface tangential to the reflective surface at the geometric center thereof. The geometric center, as is subsequently detailed hereinbelow, is the point of intersection on the quadric reflective surface between a first plane containing the first radius of curvature and a second plane containing the second radius of curvature.

Referring now to the drawings, and in particular, FIGS. 1 and 2 there is depicted therein a first embodiment of a mirror assembly 12 in accordance with the present invention. The mirror assembly 12 is shown positioned on a right front fender 13. A second mirror assembly 14 is positioned on a left front fender 15 of a vehicle 10.

If one mirror is used it is preferably mounted onto the right front fender 13 of the vehicle 10. Two of the mirrors may be mounted on the vehicle 10, one on the right front fender 13 and the other on the left front fender 15, in such a manner to enable the driver to view both sides of his vehicle 10 while minimizing the size of the blindspot behind each mirror 20.

The mirror assembly 12 and 14 as depicted in FIG. 7 is comprised of a vehicle mirror 20 which includes a reflective surface 30 and an integrally formed mounting frame 40 secured to the reflective surface; a mirror bracket 80, removably attached to the mounting frame 40; a tubular member 70, extending between the vehicular mirror 20 and the vehicle 10; and a vehicle bracket 90 which removably mounts to the vehicle 10.

The reflective surface 30 has a substantially convex shape throughout, being in the shape of a part of a quadric surface 50, and essentially is an ellipsoid or a portion thereof. Preferably, the quadric reflective surface 50 is a truncated portion of less than half of an ellipsoid. An ellipsoid is defined as a quadric surface 50, at least one section of which is elliptical in shape. As noted, the quadric surface 50 has at least one different radii of curvature.

The quadric surface 50 has a geometric center 52. The reflective surface has a viewing center point 33. To provide the driver 60 of the vehicle 10 with a full field-of-view while minimizing the blindspot behind the mirror 20, the geometric center 52 is aligned with the viewing center point 33.

The geometric center 52 is determined by bisecting the reflective surface 30 with the first plane along axis 44, and by bisecting the reflective surface with a second plane along axis 46, which is different from the first plane 44 as shown in FIG. 2. The geometric center 52 is the intersection of the first plane 44 containing the first radius of curvature, the second plane 46 containing the second radius of curvature, with the quadric surface 50. The quadric surface 50 provides a field-of-view that is greater than the reflective angle of the reflective surface 30 on axis 44,46 thereof.

The viewing center point 33 is defined as the point on the reflective surface 30 nearest the driver 60 compartment of the vehicle 10. The viewing center point 33 changes whenever the mirror 20 is repositioned relative to the driver 60. Since the reflective surface 30 is generally convex throughout, there is only one viewing center point 33 on each surface for each.

The ellipsoid mirror 20 produces a continuous image to a viewer without severe distortion. The driver 60 is able to interpret the image formed thereon and overcome the minor distortions caused by the generally convex shape.

The vehicle mirror 20 in this embodiment, as shown in FIG. 2, depicts a portion of a reflective surface 30 which is generally a convex circular shaped surface as defined by a projection onto a planar surface tangential to the reflective at the geometrical center 52. The reflective surface 30 is symmetric about a vertical axis 44 and a horizontal axis 46. The reflective surface is truncated into a generally circular shape and fitted to a frame 40. The frame 40 preferably includes a flange 45 extending continuously beyond and around the outer portion of the reflecting surface 30. The frame 40 is preferably coated with a rubber or vinyl and conforms with the shape of the edges of the truncated reflecting surface 30. The center point 33 of the reflective surface 30 and the geometric center point 52 are in-line.

FIG. 3 depicts a second embodiment of the present invention which is a generally convex square shaped reflective surface 122. The reflective surface 122 is symmetric about a vertical axis 144 and a horizontal axis 146. The reflective surface 122 is truncated, generally, into a rectangular shape and fitted to a frame 140 which conforms to the shape of the edges of the reflective surface 122. The rectangularly shaped surface is further defined by a projection onto a planar surface tangential to the reflective surface at the geometrical center 154. The center point 152 of the reflective surface 122 and the geometric center point 154 are in-line.

The third embodiment depicted in FIG. 4 of the present invention is a generally convex triangular shaped reflective surface 222 as defined by a projection onto a planar surface tangential to the reflective surface at the geometrical center 254. The reflective surface 222 is symmetrical about the vertical axis 244. The reflective surface 222 is truncated generally into a triangular shape and fitted to a frame 240 which conforms to the shape of the edges of the reflective surface 222. The center point 252 of the reflective surface 222 and the geometric center point 254 are in-line and located at a point approximately equal distance from the three points of the triangle 202, 204 and 206.

FIG. 5 depicts a fourth embodiment of the present invention which is generally a convex trapezoidal shaped reflective surface 322 as defined by a projection onto a planar surface tangential to the reflective surface at the geometrical center 354. The reflective surface 322 is symmetrical about the horizontal axis 346. The reflective surface 322 is truncated generally into a trapezoidal shape and fitted to a frame 340 which conforms to the shape of the edges of the reflective surface 322. The center point 352 of the reflective surface 322 and the geometric center point 354 are in-line and located on the horizontal axis 346 equal distance from the reflective surface's 322 parallel edges 302 and 304.

The fifth embodiment of the present invention depicted in FIG. 6 is generally a convex ring sector shaped reflective surface 422 as defined by a projection onto a planar surface tangential to the reflective surface at the geometrical center 456. The reflective surface 422 is symmetrical about the vertical axis 444. Two sides are parallel top 402 and bottom 404 arcs intersecting the vertical axis 444 equal distance from the center point 452. The reflective surface 422 is truncated generally into a ring sector shape and fitted to a frame 440 which conforms to the shape of the edges of the reflective surface 422. The center point 452 of the reflective surface 422 and the geometric center point 456 are in-line and located on the vertical axis 444 equal distance from the reflective surface's 422 top and bottom arcs 402 and 404.

The mirror bracket 80 and the vehicle bracket 90 define a mount which is, preferably, the mount described in U.S. Pat. No. 4,500,063 entitled "Fender Mount for a Mirror", by W. P. Schmidt and F. D.

Hutchinson, the disclosure of which is incorporated herein by reference.

The mirror bracket 80 and the vehicle bracket 90 includes a base member 82 and a cover member 84. The base member 82 has a mounting surface 85 and an opposed outer surface 86. The mounting surface 85 of the base member 82 of the vehicle bracket 90 is secured to the vehicle 10. The cover member 84 is secured to the outer surface 86 of the base member 82. The base member 82 and the convex member 84 define a longitudinal bore 88 therebetween for securing the lower end of the tubular member 70. The longitudinal bore 88 accepts and secures the tubular member 70. The cover member 84 is secured to the outer surface 86 of the base member 82. The base member 82 and the convex member 84 define a longitudinal bore 88 therebetween for securing the lower end of the tubular member 70. The longitudinal bore 88 accepts and secures the tubular member 70. The cover member 84 is then secured to the base member 82 by locking the tubular member 70 therebetween.

While the mirror and the related hardware have been described in conjunction with specific embodiments, it is evident that many alternatives, modifications, and variations will be apparent to those skilled in the art in light of the disclosure herein. It is intended that all such alternatives, modifications, and variations are included herein that fall within the spirit and the scope of the appended claims.

Having, thus, described the invention, what is claimed is:

1. A vehicular mirror comprising: a geometric convex quadric reflective surface which is defined by a truncated portion of less than half of an ellipsoid surface;

the quadric surface providing a field-of-view that is greater than the reflective angle of the reflective surface about an axis thereof, and wherein:

the reflective surface has a first radius of curvature and a second radius of curvature, the first radius of curvature being different from the second radius of curvature, and further wherein:

the reflective surface has a viewing center point in general alignment with the geometric center of a part of the quadric surface, the geometric center being defined as the point of intersection on the quadric surface between a first plane containing the first radius of curvature and a second plane containing the second radius of curvature.

2. The mirror of claim 1, further comprising:
   (a) a frame portion, the frame portion conforming to and being affixable to the reflective surface;
   (b) a tubular member being securable to a vehicle; and,
   (c) means for securing the frame to the tubular member.

3. The mirror of claim 2 further comprising means for securing the tubular member to a vehicle.

4. The mirror of claim 1, wherein the reflective surface is a circularly shaped surface as defined by a projection onto a planar surface tangential to the reflective surface at the geometrical center.

5. The mirror of claim 1, wherein the reflective surface is a rectangularly shaped surface as defined by a projection onto a planar surface tangential to the reflective surface at the geometrical center.

6. The mirror of claim 1, wherein the reflective surface is a triangularly shaped surface as defined by a projection onto a planar surface tangential to the reflective surface at the geometrical center.

7. The mirror of claim 1, wherein the reflective surface is a trapezoidally shaped surface as defined by a projection onto a planar surface tangential to the reflective surface at the geometrical center.

8. The mirror of claim 1, wherein the reflective surface has a ring sector shaped surface as defined by a projection onto a planar surface tangential to the reflective surface at the geometrical center.

* * * * *